Figure 1:
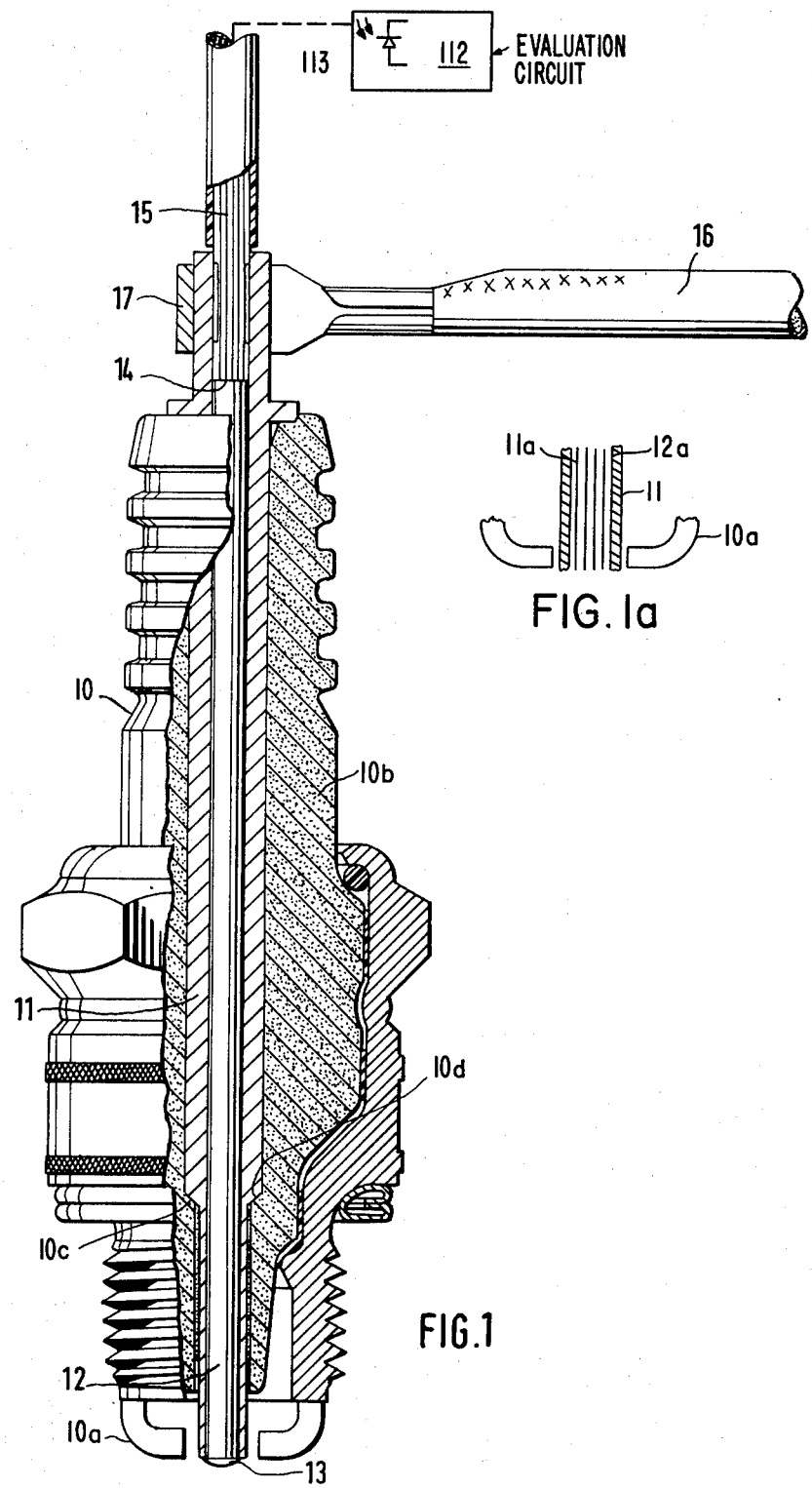

United States Patent [19]
Müller et al.

[11] 4,393,687
[45] Jul. 19, 1983

[54] SENSOR ARRANGEMENT

[75] Inventors: Klaus Müller, Tamm; Ernst Linder, Mühlacker; Helmut Maurer, Schwieberdingen, all of Fed. Rep. of Germany

[73] Assignee: Robert Bosch GmbH, Stuttgart, Fed. Rep. of Germany

[21] Appl. No.: 214,481

[22] Filed: Dec. 9, 1980

[30] Foreign Application Priority Data

Jan. 18, 1980 [DE] Fed. Rep. of Germany ....... 3001711

[51] Int. Cl.³ .................... G01L 23/22; H01T 13/48
[52] U.S. Cl. ........................................ 73/35; 313/129
[58] Field of Search .................... 73/35, 346; 250/227, 250/554; 350/96.10, 96.24, 61; 356/44, 241, 315, 417; 313/129, 123, 124

[56] References Cited
U.S. PATENT DOCUMENTS 2,841,979  7/1958  Harbert ............................. 313/129
2,919,688  1/1960  Bowpitch et al. ............. 356/241 X
3,067,610 12/1962  Bockemuehl et al. ............ 73/35 X
3,517,247  1/1968  Szilagyi ......................... 350/96.1 X

FOREIGN PATENT DOCUMENTS 831166  2/1952  Fed. Rep. of Germany .......... 73/35
263883  8/1927  United Kingdom ................ 313/129

Primary Examiner—James J. Gill
Attorney, Agent, or Firm—Frishauf, Holtz, Goodman & Woodward

[57] ABSTRACT

The sensor arrangement to determine oscillations arising upon knocking of a combustion engine uses at least one optical receiver, known per se, in the combustion chamber, preferably a glass rod 12 or a light guide cable of glass fibers 20. The optical receivers are either integrated in the spark plug, or connected to a pre-chamber, or inserted in the cylinder head seal.

7 Claims, 7 Drawing Figures

SENSOR ARRANGEMENT

The invention relates to a sensor arrangement and more particularly to an optical sensor to sense the combustion process in an internal combustion engine and determine premature combustion which might lead to engine knocking.

BACKGROUND

It is known that, under certain operating conditions, "knocking" will arise in internal combustion engines. Under "knocking", one understands audio frequency oscillations of the compressed fuel-air mixture which is triggered by a pulse wave. During these oscillations, the heat transfer is highly enhanced at the piston and cylinder walls of the combustion engine. This results in damaging thermal overloading of these surfaces. Knocking, therefore, is to be difinitely avoided. It is necessary, however, to provide means which early and reliably indicate knocking in order to utilize the possible working range of the combustion engine as extensively as possible. A plurality of sensors have been known or proposed therefor. For example, U.S. Pat. No. 4,275,586, GAST et al, assigned to the assignee of this application, to which German Patent Disclosure Document DE-OS No. 28 01 969 corresponds, describes a sensor in which a resonant system is formed with the aid of a piezoelectric oscillation element operating as a bending oscillator which can indicate knocking of the internal combustion engine. The mechanical effectiveness of this structure is not free from disturbances, particularly upon strong jolts which may occur in a motor vehicle.

It is further known to optically observe and measure the course of combustion in a combustion engine. For example, a spectrometric measuring system to examine combustion of a Diesel motor is described in "Motortechnische Zeitschrift", Vol. 39 (1978) page 385 in which a quartz window is supplied in the combustion chamber wall through which spectrometric observation of the course of combustion is possible. It is also known from German Patent Disclosure Document DE-OS No. 27 01 777 to arrange a light sensitive sensor in the combustion space on which a laser beam is impinged which previously was tangent to the terminal end of an injection nozzle in order to measure in this manner the injection time at injection valves. An optical analyzing apparatus is known from the "Rev. Tech. Automob.", 1979, pages 89, 90, which is screwed into the combustion engine at the position of the spark plugs in order to carry out calorimetric analysis of the fuel-air mixture. An arrangement was described in a workshop meeting "Kohlenwasserstoffemission" der Forschungsvereinigung Verbrennkraftmaschinen e.V. ("Hydrocarbon Emission" of the Research Society for Combustion Engines, registered society) on Oct. 10, 1979 in Aachen in a presentation by Spicher, in which the spreading of flames in the combustion space of the combustion engine is sensed by light guides and subsequently connected photodiodes, which light guides are screwed in the cylinder wall.

THE INVENTION

It is an object to provide a sensing device which is integrated with a mass-produced production-type spark plug for an internal combustion (IC) engine, for example of the automotive type, and which can reliably and early indicate knocking of the engine by optical sensing of the combustion process.

Briefly, the combined spark plug and optical sensor has an electrical or sparking portion and an optical combustion observation or sensing portion. A standard spark plug housing forms the ground or chassis electrode and has the customary spark gap ground electrode projecting therefrom at the spark gap. The center electrode, in accordance with the invention, is hollow and includes therein a light guide element, preferably a glass rod, which extends through a major portion thereof but terminates short of the end of the glass tube at the connecting end, that is, the end remote from the spark gap. The insulator, in customary manner, is located between the electrode metal tube and the housing, supporting both the metal tube as well as the light guide element, for example a glass rod therein. The metal tube is retained in the housing by a seat against a shoulder formed in the insulator between the metal tube and the outer part of the housing. A light pick-up surface is located at the terminal end of the light guide element, adjacent the end of the metal tube. The metal tube thus protects the light guide element, while providing for passage of electrical current close to the ground electrode, the spark gap jumping over between the metal tube and the ground electrode, with the light guide element being positioned within the metal tube so that it will not be subjected to a creeping or passing spark discharge. A light guide cable is coupled to the light guide element by being introduced within the end portion of the metal tube, the light guide cable being connected to an evaluation circuit, for example including a photo diode.

The sensor arrangement in accordance with the invention with the characteristic features of the main claim has the advantage thereover to early and reliably indicate knocking of a combustion engine without contact and without mechanically moving parts, while using standard elements readily, industrially, available and without major modification.

DRAWINGS

Figures 2, 3, 3A:
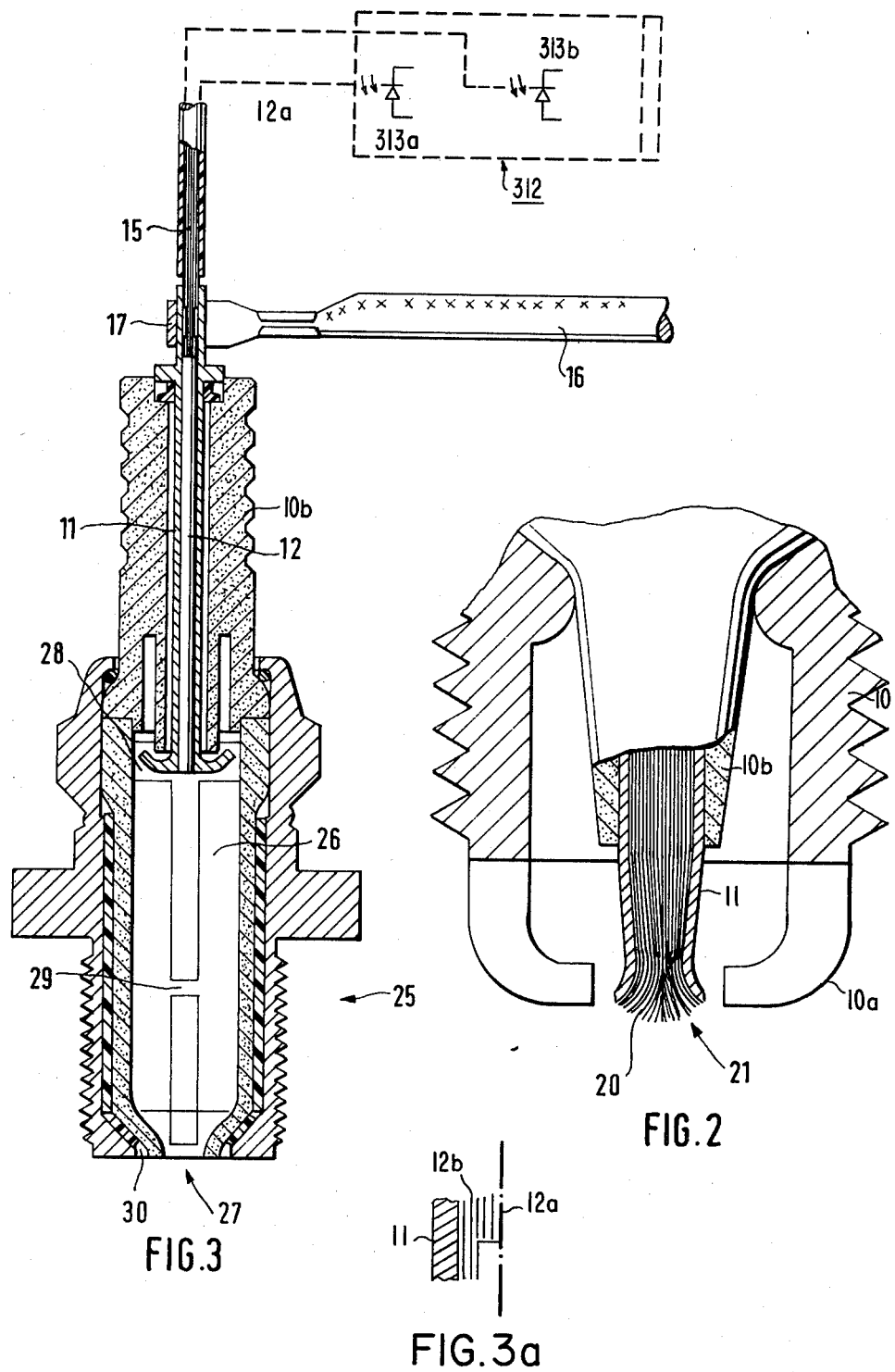
Figure 4:
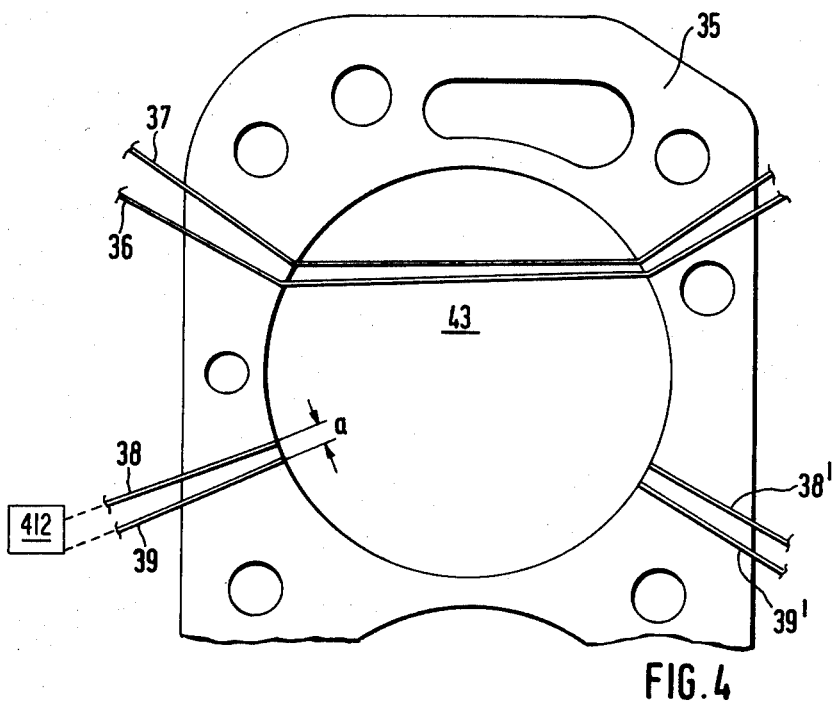

Various embodiments of the sensor arrangement in accordance with the invention are illustrated in the drawing and further described in the description to follow. There are shown:

FIG. 1 a sensor arrangement with a light guide rod in a spark plug;

FIG. 1a is a schematic fragmentary view of a combined metal filament-light guide filament center electrode;

FIG. 2 a sensor arrangement with a light guide cable in a spark plug;

FIG. 3 a sensor arrangement with a light guide which is connected to a pre-chamber;

FIG. 3a is a fragmentary half-sectional view of another embodiment of the light guide arrangement of FIG. 3;

FIG. 4 a sensor arrangement in a cylinder head seal; and

Figure 5:
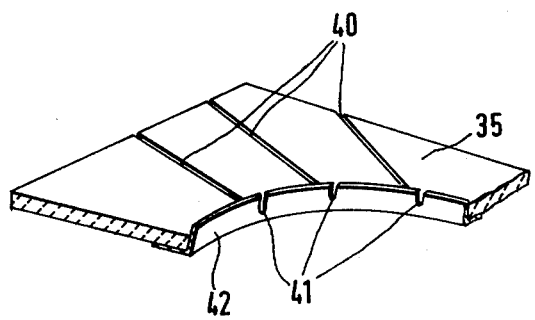

FIG. 5 a perspective illustration of a portion of the arrangement illustrated in FIG. 4.

DESCRIPTION OF THE EXAMPLES OF EMBODIMENTS

A pulse wave, that is, an intense gas oscillation occurs upon knocking of a combustion engine, which generates variations in brightness in a light sensitive sensor located in the combustion chamber. Early recognition of knocking phenomena in combustion engines is necessary to utilize the working range of the engine. It is possible to observe the knocking as such, as well as occurrence of the gas oscillation, and the temporal course of the knocking process, that is, the spreading of the gas oscillation, or the decay of the oscillation amplitude. If additionally the spatial spread of the oscillation is to be observed, it is necessary that a plurality of sensors are locally distributed in the combustion chamber. With such a plurality of sensors, the position of the flame additionally can be sensed.

In accordance with the invention, oscillations which occur upon knocking in a combustion engine are sensed by an optical receiver, (known per se), in the combustion chamber. Suitable evaluation circuits are connected to this optical receiver which are tuned to the respective knocking frequency range of the respective combustion engine. A light guide connected to the combustion chamber which is closed off at its other end with a photocell is particularly preferred.

In the first embodiment of the invention illustrated in FIG. 1, the light guide is integrated in a spark plug. The spark plug housing 10 with a ground electrode 10a, as is usual. The plug also has a metal tube 11 as an electrode, which surrounds a light guide rod 12. The metal tube 11 is secured in the usual spark plug insulation 10b. The light guide rod 12 at the electrode end at the side of the combustion chamber forms an eye 13 which thereby enables optical observation of the combustion chamber. The light guide rod 12 shorter than tube 11 and is connected, over a boundary surface 14, to a light guide cable 15 which leads from within tube 11 to an evaluation circuit 12 with a photoelectric element, for example a photodiode. The electrical connection of the spark plug is over an ignition cable 16 and a ring plug 17. The metal tube 11 is seated in the insulator by a shoulder 10d engaging a matching shoulder 10c of the insulator.

In the second embodiment of the invention illustrated in FIG. 2, a light guide fiber cable 20 is used instead of the light guide rod 12. The light guide fiber cable 20, for example, is a glass fiber cable which forms at the end of the electrode at the combustion chamber side a spread brush 21. A wider angle in space within the combustion chamber can be observed by use of the brush 21.

The third example illustrated in FIG. 3 utilizes an ignition system 25 with an ante-chamber 26. The ante-chamber 26 has pre-spark paths having a first spark gap 28 at the upper end and a second spark gap 29 in the center thereof. A third spark gap 30 is formed at the combustion side opening 27 of the chamber.

In the arrangement according to FIG. 3, the light guide is again formed as a light guide rod 12 which is located in a metal tube 11 serving as the electrode. The light guide rod 12 defines a predetermined angle in space in which the chamber 26 or the combustion chamber, respectively, can be observed through the chamber opening 27. If the light guide is formed, however, as a light guide fiber cable, then it is desirable to recess the central fibers 12a of the light guide fiber cable (see FIG. 32) with respect to the outer fibers 12b, so that those fibers will have a smaller aperture, which can be so arranged that these fibers will observe exclusively the combustion space through the chamber opening 27. If the respective signals for the chamber space 26 and the combustion chamber are to be separately evaluated by photo diode 313a, 313b in evaluation circuit 312, then the corresponding fibers are again separated in the receiving portion and the signals which correspond to optical observation of the chamber 26, or the combustion chamber, respectively, are correspondingly separately processed.

Of course, it is possible to combine the characteristics of the light guide fiber cable 20 (FIG. 2) and of the metal tube 11 in such a manner that a mixed cable of light guide fibers 12d and voltage carrying metal fibers is used. The metal fibers and the light guide fibers 11a, see FIG. 1a are respectively separated in the ignition control apparatus and are applied to the respective supply and evaluation circuits.

Further, in accordance with a feature of the invention, a good effect can be obtained by positioning the light guide on the spark plug concentrically so that, especially, also the beginning of flaming, about the plug can be observed. A mirror surface applied to a glaze at the outer skin of the spark plug insulator is particularly suitable therefor. In this case, the light signal is transmitted over the ring-shaped skin to the end of the spark plug insulator and from there further conducted suitably from a circle of light guides for optical reception. In similar manner, in accordance with the invention, an integral sensing of light can be so obtained that a spark plug insulator tip made of glass is used, in which the glass insulator preferably is externally mirrored and scanned with light guides.

A further embodiment of the invention is illustrated in FIGS. 4 and 5. FIG. 4 shows a cylinder head seal 35 in which pairs of light guide cables 36, 37; 38, 39; 38', 39' are located in grooves 40 of the cylinder head seal 35, or in notches 41 of a metal setting 42 of the cylinder head seal 35. The arrangement in accordance with FIGS. 4 and 5 can suitably be made by first stretching light guide fibers 36, 37, 38, 39 over the free opening 43 of the cylinder head seal 35. After turning-up the metal setting 42, the stretched fibers are melted onto the metal setting, severed, and ground, so that they terminate flush with the edge of the metal setting 42 at the combustion chamber side thereof. In this way, sensor arrangements as shown in the lower portion of FIG. 4 at 38, 39, 38', 39' are obtained. As above mentioned, observation of the temporal amplitude course and the spatial spread of the oscillations of the gas occurring upon knocking is possible only with spatially distributed sensors. By the method above described, such observation can be obtained over the light guide fiber cables 38, 39; 38', 39'. Preferably, the distance a between a pair of light guide fiber cables 38, 39; 38', 39' is so selected that the oscillation amplitude is somewhat greater than a. By differential evaluation of the signals from both fibers in evaluation circuit 412, a periodic signal is obtained in the knocking region, for example to determine if the course of the amplitude of the gas oscillation is damped.

We claim:

1. Engine knock sensor arrangement to detect oscillations arising upon knocking in an internal combustion engine due to undesired progress of the course of combustion within a combustion chamber thereof, said engine having a cylinder head seal (35);
and comprising sensing means including
a pair of light guide fibers or filaments (36, 37; 38, 39) positioned within the cylinder head seal;
light guide means in optically coupled relation with respect to said light guide fibers or filaments;
and photoelectric evaluation means (412) connected to said light guide means for photoelectric evaluation of light sensed by said light guide fibers or filaments.

2. Arrangement according to claim 1, wherein the individual light guide filaments of the pair are spaced from each other by a distance (a) which is somewhat greater than the amplitude of the pulse or shock wave occurring in the combustion chamber upon knocking of the engine.

3. Arrangement according to claim 1, wherein the cylinder head seal includes a cylinder liner (42) formed with notches;

and said fibers or filaments comprise severed ends of the filaments sealed in said notches and located at least substantially flush with respect thereto.

4. Method to make a sensing arrangement according to claim 1, comprising the steps of: providing a cylinder head seal (35) with recesses or grooves (41) therein; providing a cylinder head liner (42) formed with notches (41) therein, matching the grooves or recesses in the seal (35);

positioning light guide fibers in said recesses or grooves and in said notches, and spanning the cylinder head opening (43) of the liner and of the seal;

melting-on the filaments or fibers in the notches (41) of the liner (42) and severing the portions of the filaments stretched across said opening (43);

and finishing the surface ends of the melted-on fibers or filaments to be essentially flush with the inner surface of the liner (42) adjacent said notches (41).

5. Combined spark plug and optical sensor structure having an electrical or sparking portion and an optical combustion observation portion to determine oscillations occurring upon knocking of an internal combustion engine having a housing (10) forming a ground or chassis electrode for the electrical portion, and having a spark gap ground electrode (10a) secured thereto;

a metal tube (11) extending centrally within the housing and forming a center electrode of the sparking portion terminating adjacent the ground electrode, and spaced therefrom by a spark gap;

a light guide element (12) located within the metal tube and terminating essentially even with the end of the tube adjacent the spark gap, but short of the end of the tube at the other end thereof;

an insulator (10b) located between said center electrode metal tube and the housing, electrically separating the housing and the metal tube and supporting the metal tube, and the light guide element therein, within the housing;

a light pick-up surface (13, 20) formed at the end of the light guide element;

and a light guide cable (15) having an optical coupling surface positioned in optically coupled relation with respect to the light guide element (12) and located within the end portion of the metal tube (11) remote from the spark for connection of optical signals derived from the light guide element to an electrical evaluation circuit (112);

wherein the spark plug comprises an ante-chamber (26);

and wherein the light guide element comprises a light guide element portion (12a) recessed with respect to the end portion of said tube (11) and a further light guide portion (12b) terminating essentially flush with the end of said tube (11) to provide two different viewing apertures for the respective light guide element portions.

6. Structure according to claim 5, wherein the light guide portions comprise cabled light guide fibers.

7. Combined spark plug and optical sensor structure having an electrical or sparking portion and an optical combustion observation portion to determine oscillations occurring upon knocking of an integral combustion engine having a housing (10) forming a ground or chassis electrode for the electrical portion, and having a spark gap ground electrode (10a) secured thereto;

a metal tube (11) extending centrally within the housing and forming a center electrode of the sparking portion terminating adjacent the ground electrode, and spaced therefrom by a spark gap;

a light guide element (12) located within the metal tube and terminating essentially even with the end of the tube adjacent the spark gap, but short of the end of the tube at the other end thereof;

an insulator (10b) located between said center electrode metal tube and the housing, electrically separating the housing and the metal tube and supporting the metal tube, and the light guide element therein, within the housing;

a light pick-up surface (13, 20) formed at the end of the light guide element;

and a light guide cable (15) having an optical coupling surface positioned in optically coupled relation with respect to the light guide element (12) and located within the end portion of the metal tube (11) remote from the spark for connection of optical signals derived from the light guide element to an electrical evaluation circuit (112);

wherein said light guide element comprises a plurality of light guide fibers, the center electrode metal tube (11) being slightly flared at the terminal end portion, and the light guide fibers being spread out adjacent the flared end portion in form of a brush.

* * * * *

UNITED STATES PATENT AND TRADEMARK OFFICE
CERTIFICATE OF CORRECTION

PATENT NO. : 4,393,687
DATED : July 19, 1983
INVENTOR(S) : Klaus MULLER et al

It is certified that error appears in the above—identified patent and that said Letters Patent is hereby corrected as shown below:

Claim 4, line 2 (col.5 line 17) change "claim 1" to -- claim 3 -- col. 3, line 35 after "photodiode" insert -- 113 --, col. 3, line 61 change "32" to -- 3a --, col. 4, line 8 change "12d" to -- 12a --, col. 4, lines 8-9 change "metal fibers is used" to read -- metal fibers 11a, see Fig. 1a is used --.

Signed and Sealed this

Tenth Day of January 1984

[SEAL]

Attest:

GERALD J. MOSSINGHOFF

Attesting Officer  Commissioner of Patents and Trademarks